United States Patent
Isoda et al.

(10) Patent No.: US 7,037,446 B2
(45) Date of Patent: May 2, 2006

(54) RADIATION IMAGE STORAGE PANEL

(75) Inventors: Yuji Isoda, Kanagawa (JP); Keiko Neriishi, Kanagawa (JP); Atsunori Takasu, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/776,622

(22) Filed: Feb. 12, 2004

(65) Prior Publication Data

US 2004/0227113 A1 Nov. 18, 2004

(30) Foreign Application Priority Data

Feb. 12, 2003 (JP) .............................. 2003-033850

(51) Int. Cl.
*G21K 4/00* (2006.01)
(52) U.S. Cl. .............................. 252/301.4 H; 250/581; 428/690; 430/6

(58) Field of Classification Search ................ 250/581; 428/690; 252/301.4 H; 430/6
See application file for complete search history.

(56) References Cited

U.S. PATENT DOCUMENTS

| 6,730,243 B1 * | 5/2004 | Leblans et al. ....... 252/301.4 H |
| 2002/0041977 A1 * | 4/2002 | Iwabuchi et al. ............ 428/690 |
| 2003/0113580 A1 * | 6/2003 | Takasu et al. .............. 428/690 |

* cited by examiner

*Primary Examiner*—C. Melissa Koslow
(74) *Attorney, Agent, or Firm*—Sughrue Mion, PLLC

(57) ABSTRACT

In a radiation image storage panel composed of a phosphor layer produced by vapor phase deposition, the phosphor layer is composed of an europium activated cesium halide stimulable phosphor and exhibits an ultraviolet light-excited emission spectrum satisfying the condition of:

$$0 < S(400\text{--}420) < 0.20$$

in which $S(400\text{--}420)$ represents a ratio of an amount of a light emitted by a luminous component giving an emission peak in the region of 400 to 420 nm based on the total amount of emitted light.

4 Claims, 2 Drawing Sheets

RADIATION IMAGE STORAGE PANEL

FIELD OF THE INVENTION

The invention relates to a radiation image storage panel favorably employable in a radiation image recording and reproducing method utilizing stimulated emission of a stimulable phosphor.

BACKGROUND OF THE INVENTION

When the stimulable phosphor is exposed to radiation such as X-rays, it absorbs and stores a portion of the radiation energy. The stimulable phosphor then emits stimulated emission according to the level of the stored energy when exposed to electromagnetic wave such as visible or infrared light (i.e., stimulating rays).

A radiation image recording and reproducing method utilizing the stimulable phosphor has been widely employed in practice. The method employs a radiation image storage panel comprising the stimulable phosphor, and comprises the steps of causing the stimulable phosphor of the storage panel to absorb radiation energy having passed through an object or having radiated from an object; sequentially exciting the stimulable phosphor with a stimulating ray to emit stimulated light; and photo-electrically detecting the emitted light to obtain electric signals giving a visible radiation image. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as stimulable phosphor sheet) has a basic structure comprising a support and a stimulable phosphor layer provided thereon. However, if the phosphor layer is self-supporting, the support may be omitted. Further, a protective film is normally provided on the free surface (surface not facing the support) of the phosphor layer to keep the phosphor layer from chemical deterioration or physical shock.

The phosphor layer generally comprises a binder and a stimulable phosphor dispersed therein. However, there is a known phosphor layer comprising agglomerate of a stimulable phosphor without binder. The phosphor layer containing no binder can be formed by a vapor phase deposition method or by a firing method. It is also known to impregnate with a polymer material the phosphor layer comprising stimulable phosphor agglomerate.

JP 2001-255610 A discloses the radiation image recording and reproducing method of another type. While a stimulable phosphor of the storage panel used in the conventional type has both of radiation-absorbing function and energy-storing function, those two functions are separated in the disclosed method. In the method, a radiation image storage panel comprising a stimulable phosphor (which stores radiation energy) is used in combination with a phosphor screen comprising another phosphor which absorbs radiation and emits ultraviolet or visible light. The disclosed method comprises the steps of causing the radiation-absorbing phosphor of the screen to absorb and convert radiation having passed through an object or having radiated from an object into ultraviolet or visible light; causing the energy-storing phosphor (stimulable phosphor) of the storage panel to store the energy of the converted light as radiation image information; sequentially exciting the stimulable phosphor with a stimulating light to emit stimulated light; and photo-electrically detecting the emitted light to obtain electric signals giving a visible radiation image. The present invention can be also applied to the radiation image storage panel used in this type of the method.

In any case, it is desired that radiation image storage panels have sensitivity as high as possible and further can give a reproduced radiation image of high quality (in regard of sharpness and graininess).

In order to improve the sensitivity and the image quality, it has been proposed that the phosphor layer of the storage panel be prepared by a vapor phase deposition method such as vacuum vapor deposition or sputtering. The process of vacuum vapor deposition, for example, comprises the steps of heating an evaporation source comprising the phosphor or materials thereof for vaporization by means of a resistance heater or an electron beam, and depositing the vapor on a substrate such as a metal sheet to form a film (layer) of the phosphor in the form of columnar crystals.

The phosphor layer formed by the vapor phase deposition method contains no binder and consists of the phosphor only, and there are cracks among the columnar crystals of the phosphor. Because of the presence of the cracks, the stimulating light can stimulate the phosphor efficiently and the emitted light can be collected efficiently, too. Accordingly, a radiation image storage panel having the phosphor layer formed by the vapor phase deposition method has high sensitivity. At the same time, since the cracks prevent the stimulating light from diffusing parallel to the phosphor layer, the storage panel can give a reproduced image with a high sharpness.

WO 01/03156A1 discloses a CsX:Eu stimulable phosphor and a phosphor screen having a phosphor layer thereof formed by a vapor phase deposition method. The publication also discloses a ultraviolet light(280 nm)-excited instant emission spectrum of a phosphor film comprising a CsBr:Eu stimulable phosphor formed by the vapor deposition method. In the spectrum, there is a sharp peak at approx. 440 nm but no emission peak is observed in the wavelength region of 400 to 420 nm.

SUMMARY OF THE INVENTION

It is an object of the present invention to provide a radiation image storage panel remarkably improved in sensitivity.

The present inventors have studied sensitivity (corresponding to an amount of stimulated emission) of a radiation image storage panel which has a phosphor layer comprising a stimulable phosphor of europium activated cesium halide (CsX:Eu in which X is a halogen), and found a relation between the amount of stimulated emission and the ultraviolet light-excited emission spectrum. The above-mentioned phosphor generally gives an instant emission having a peak in the region of 440 to 460 nm (the stimulated emission spectrum of the phosphor also has a main peak in this wavelength region, and the amount of stimulated emission depends on this main peak). The inventors have found that, if the phosphor layer also gives another instant emission having a peak in the region of 400 to 420 nm in a particular amount based on the amount of the instant emission of 440 to 460 nm, the stimulated emission is remarkably enhanced.

The present invention resides in a radiation image storage panel comprising a phosphor layer produced by a vapor phase deposition method, wherein the phosphor layer comprises an europium activated cesium halide stimulable phosphor and exhibits an ultraviolet light-excited emission spectrum satisfying the condition of:

$$0 < S(400–420) < 0.20$$

in which S(400–420) represents a ratio of the amount of light emitted by a luminous component giving an emission peak in the region of 400 to 420 nm based on the total amount of emitted light.

The term "total amount of emitted light" means a value obtained by the steps of resolving the observed emission spectrum into two or more spectrum components on the basis of Gaussian fitting, estimating an integrated emission intensity of each component within each half-width, and totalizing the intensities of all the spectrum components. The term "amount of light emitted by a luminous component giving an emission peak in the region of 400 to 420 nm" means the integrated emission intensity within the half-width of the spectrum component having that peak.

The S(400–420) preferably is not less than 0.01.

In producing the phosphor layer of CsX:Eu by a vapor phase deposition method such as vacuum vapor deposition, the activator Eu is liable to react with oxygen in air to form Eu—O during the evaporation-deposition process. The formed Eu—O is often contained in the deposited phosphor layer consisting of the columnar phosphor crystals, to decrease $Eu^{2+}$-vacant lattice points in the crystals. Consequently, since the stimulated emission is based on the $Eu^{2+}$-vacant lattice points, the amount of the stimulated emission decreases. The inventors have studied this problem and finally found that the columnar phosphor crystals can be made to contain a sufficient amount of the activator in the form of $Eu^{2+}$ by increasing the partial pressure of hydrogen halide (HX) in the vapor deposition atmosphere to prevent the formation of Eu—O and/or by subjecting the deposited layer to heating treatment to decompose the formed Eu—O. It has been also found that, in performing this process, the activator reacts with an excess amount of halogen X to form $EuX_2$ and the formed $EuX_2$ is deposited on the surface of the columnar crystals. Accordingly, the thus-formed phosphor layer gives an instant emission spectrum having not only a peak (in the region of 440 to 460 nm) attributable to the $Eu^{2+}$-vacant lattice points but also another peak (in the region of 400 to 420 nm) attributable to the $EuX_2$. The inventors have further found that, if the ratio of the amount of light emitted by the $EuX_2$ based on the total amount of emitted light is more than 0 and less than 0.2, the stimulated emission (emitted from the $Eu^{2+}$-vacant lattice points) is remarkably enhanced.

DETAILED DESCRIPTION OF THE INVENTION

The europium activated cesium halide stimulable phosphor used in the radiation image storage panel of the invention is preferably represented by the following formula (I):

$$CsX.aM^{I}X'.bM^{II}X''_2.cM^{III}X'''_3:zEu \qquad (I)$$

in which $M^{I}$ is at least one alkali metal element selected from the group consisting of Li, Na, K and Rb; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of X, X', X" and X''' is independently at least one halogen selected from the group consisting of F, Cl, Br and I; and a, b, c and z are numbers satisfying the conditions of $0 \leq a < 0.5$, $0 \leq b < 0.5$, $0 \leq c < 0.5$ and $0 < z < 1.0$, respectively.

The radiation image storage panel of the invention is explained below referring to the attached drawings.

Figure 1:
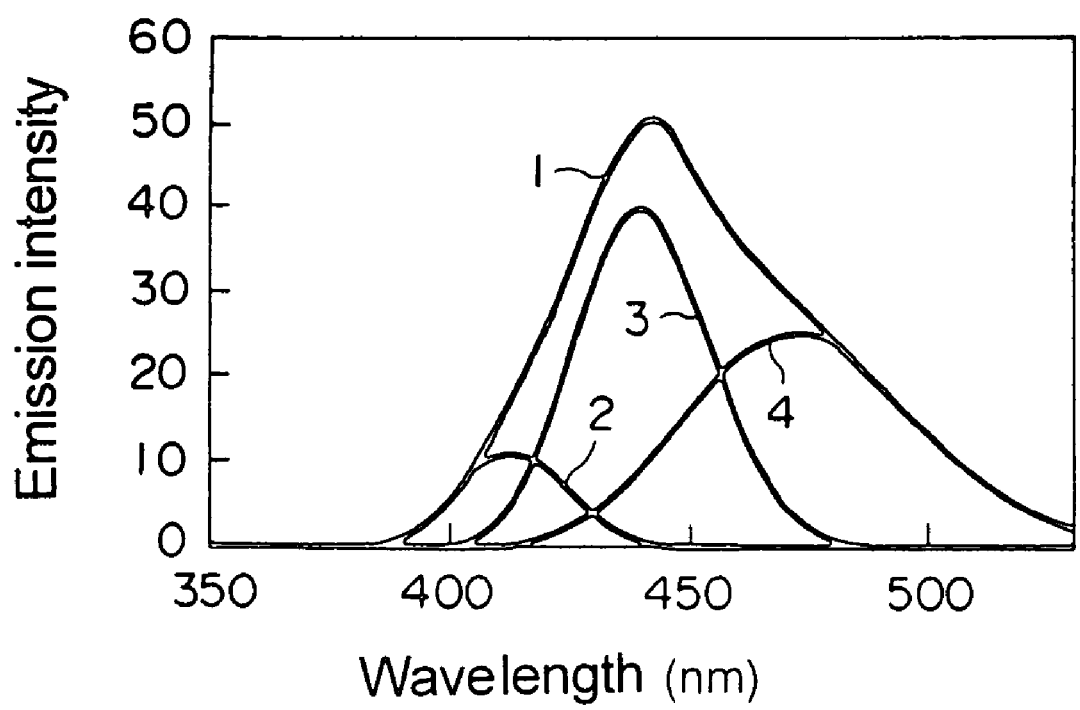
FIG. 1 shows a ultraviolet light-excited instant emission spectrum of a phosphor layer in a radiation image storage panel of the invention.

When a radiation image storage panel of the invention (storage panel prepared in Example 2 described after) comprising a support and a CsBr:Eu stimulable phosphor layer formed by vapor deposition is excited with ultraviolet light (290 nm), the phosphor layer gives an instant emission spectrum shown in FIG. 1. In FIG. 1. the curve 1 stands for the observed instant emission spectrum and each of the curves 2 to 4 stands for spectrum components extracted from the observed spectrum utilizing Gaussian fitting.

The three extracted spectrum components have the following different peaks and are attributed to the following different luminous components:

[curve 2] peak: 400 to 420 nm, luminous component: $EuBr_2$;

[curve 3] peak: 440 to 460 nm, luminous component: $Eu^{2+}$-vacant lattice points (CsBr:Eu); and

[curve 4] peak: 470 to 500 nm, luminous component: Eu—O complex.

The above-mentioned phosphor layer gives a stimulated emission spectrum (primary stimulating radiation: X-rays, secondary stimulating light: 633 nm) having a peak in the region of 440 to 460 nm (i.e., the stimulated emission of CsBr:Eu is attributed to $Eu^{2+}$-vacant lattice points) but no peak in the region of 400 to 420 nm. According to Phys. Stat. Sol. (b)203, 591(1997), the ultraviolet light-excited emission spectrum of CsCl:Eu phosphor has peaks at 433 nm (attributed to Eu aggregates), at 440 nm (attributed to Eu-vacant lattice points) and at 453 nm and 487 nm (attributed to Eu aggregates).

The radiation image storage panel of the invention exhibits an ultraviolet light-excited emission spectrum, as shown in FIG. 1, satisfying the condition of:

$$0 < S(400–420) < 0.20$$

in which S(400–420) represents a ratio of the amount of light emitted by a luminous component giving an emission peak in the region of 400 to 420 nm based on the total amount of emitted light.

The term "total amount of emitted light" means a value obtained by the steps of resolving the observed emission spectrum into two or more spectrum components on the basis of gaussian fitting, estimating an integrated emission intensity of each component within each half-width, and totalizing the intensities of all the spectrum components. The term "amount of light emitted by a luminous component giving an emission peak in the region of 400 to 420 nm" means the integrated emission intensity within the half-width of the spectrum component having that peak. For example, the total amount of the emission shown in FIG. 1 is the total sum of the integrated emission intensities of the spectrum components 2 to 4 within their half widths. Accordingly, the ratios of all the components calculated in the above manner satisfy the condition of $S(400-420)+S(440-460)+S(470-500)=1$.

If the phosphor layer contains the $EuX_2$ component giving an instant emission peak in 400 to 420 nm in such an amount that S(400–420) may satisfy the above condition, the stimulated emission emitted by the phosphor layer is remarkably enhanced. In other wards, when the emission ratio S(400–420) of $EuX_2$ component is in the above region, the amount (absolute value) of stimulated emission attributed to $Eu^{2+}$-vacant lattice points increases. (At the same time, the amount of instant emission is presumed to increase, too.)

From the theoretical viewpoint, it is desired that the phosphor layer (vapor-deposited film) of the radiation image storage panel consist of pure $Eu^{2+}$-activated CsX stimulable phosphor only and contain neither Eu—O complex nor $EuX_2$. Practically, however, the columnar crystals of CsX contains both Eu—O complex and $EuX_2$, and hence the activation efficiency of $Eu^{2+}$ is so lowered that the stimulated emission in 440 to 460 nm decreases. In order to solve the problem, the vapor deposition process may be carried out under a high partial pressure of hydrogen halide (HX) to prevent the formation of Eu—O. If so, a portion of $Eu^{2+}$ reacts with the excess amount of halogen X to form $EuX_2$ and the formed $EuX_2$ is deposited on the surface of the columnar crystals. The vapor-deposited film is then subjected to heating treatment, and thereby the deposited $EuX_2$ is effectively decomposed and the Eu—O complex is also decomposed so that oxygen can be diffused into the crystals. In this way, the activation efficiency of $Eu^{2+}$ can be increased and accordingly the stimulated emission in 440 to 460 nm is enhanced. Even if only the heating treatment is carried out after the deposition process, a similar effect can be expected. As a result, the amount of the simulated emission greatly increases when the ratio of the instant emission attributed to $EuX_2$ component S(400–420) satisfies the condition of:

$0<S(400-420)<0.20$.

It is undesired that the vapor-deposited film contain too much $EuX_2$ because an excess amount of $EuX_2$ gives adverse effects on the crystal growth to make the film fragile and moisture absorbing.

The radiation image storage panel of the invention can be prepared, for example, in the following manner.

In the following description, the process for preparation of the storage panel is explained in detail, by way of example, in the case where an electron beam deposition process (which is an example of vapor phase deposition method) is adopted.

The europium activated cesium halide phosphor used in the invention is preferably represented by the aforementioned formula (I). For ensuring a sufficient amount of stimulated emission, X in the formula (I) is preferably Br. The number represented by z, which corresponds to the amount of the activator Eu, preferably satisfies the condition of $0.001 \leq z \leq 0.01$ in consideration of the amount of stimulated emission and the physical strength of the deposited layer (vapor accumulated film). Further, $M^I$ is preferably K and/or Rb, and X' is preferably Cl and/or Br. In addition, metal oxides such as aluminum oxide, silicon dioxide and zirconium oxide may be incorporated as additives in an amount of 0.5 mol or less based on 1 mol of CsX.

A substrate on which the vapor is deposited can be a support of the radiation image storage panel, and hence can be optionally selected from known materials conventionally used as a support of the storage panel. The substrate is preferably a sheet of quartz glass, sapphire glass, metal (e.g., aluminum, iron, tin, chromium) or heat-resistant resin (e.g., aramide). For improving the sensitivity or the image quality (e.g., sharpness and graininess), a conventional radiation image storage panel often has a light-reflecting layer containing a light reflecting material such as titanium dioxide or a light-absorbing layer containing a light-absorbing material such as carbon black. These auxiliary layers can be provided on the storage panel of the invention. Further, in order to promote growth of the columnar crystals, a great number of very small convexes or concaves may be provided on the substrate surface on which the vapor is deposited. If an auxiliary layer such as a subbing layer (adhesive layer), a light-reflecting layer or a light-absorbing layer is formed on the deposited-side surface of the substrate, the convexes or concaves may be provided on the surface of the auxiliary layer.

The phosphor layer (vapor-deposited film) is preferably formed by multi-vapor deposition (co-deposition). In that case, at least two evaporation sources are used. One of the sources contains a matrix material of the stimulable phosphor, and the other contains an activator material. The multi-vapor deposition is preferred because the vaporization rate of each source can be independently controlled even if the materials have very different vapor pressures. According to the composition of the desired phosphor, each source may consist of the matrix material or the activator material only or otherwise may be a mixture thereof with additives. Three or more sources may be used. For example, in addition to the above-mentioned sources, an evaporation source containing additives may be used.

The matrix material of the phosphor may be either CsX itself or a mixture of two or more substances that react with each other to produce CsX. The activator material generally is a compound containing Eu, for example, Eu halide. The Eu-containing compound generally contains both $Eu^{2+}$ and $Eu^{3+}$, but the content of $Eu^{2+}$ is preferably 70% or more by molar ratio because the aimed stimulated emission (or instant emission) is emitted from the phosphor activated by $Eu^{2+}$. The Eu-containing compound is preferably represented by $EuX_m$ in which m is a number preferably satisfying the condition of $2.0 \leq m \leq 2.3$. Ideally the value of m should be 2.0, but if so oxygen is liable to contaminate the compound. The compound is most stable when m is approximately 2.2.

The evaporation source preferably has a water content of not more than 0.5 wt. %. For preventing the source from bumping, it is important to control the water content to keep the above-mentioned low value particularly if the material of matrix or activator is a moisture-absorbing substance such as EuBr or CsBr. The materials are preferably dried by heat treatment at 100 to 300° C. under reduced pressure. Otherwise, the materials may be heated under dry atmosphere (e.g., nitrogen gas atmosphere) to melt at a temperature above the melting point for several minutes to several hours.

The evaporation source preferably has a relative density of preferably 80% to 98%, more preferably 90% to 96%. If the relative density is low (namely if the source is in the form of powder), the powder is often sprinkled during vaporization and/or the source is liable to be evaporated so unevenly that the deposited phosphor film (layer) is uneven thickness. Therefore, for ensuring stable evaporation and deposition, the relative density is preferably in the particular range. In order to control the density in the above range, generally the material in the form of powder is pressed with a pressure of 20 Mpa or more or otherwise is heated to melt at a temperature above the melting point to give a tablet. The evaporation source, however, is not always required to be in the form of a tablet.

The evaporation source, particularly the source containing the matrix material, contains impurities of alkali metal (alkali metals other than ones constituting the phosphor) preferably in a content of 10 ppm or less and impurities of alkaline earth metal (alkaline earth metals other than ones constituting the phosphor) preferably in a content of 1 ppm or less. Such preferred evaporation source can be prepared from materials containing little impurities. In this way, a deposited film less contaminated with the impurities can be produced, and thus-produced film gives an increased amount of emission.

The evaporation sources and the substrate are placed in a vacuum evaporation-deposition apparatus, and the apparatus is then evacuated to give an inner pressure of $1 \times 10^{-5}$ to $1 \times 10^{-2}$ Pa. An inert gas such as Ar, Ne or $N_2$ gas may be introduced into the apparatus with keeping the inner pressure at that level.

In order to prevent formation of Eu—O complex, a partial pressure of hydrogen halide (HX) in the atmosphere of the apparatus is preferably controlled in the range of $2.5 \times 10^{-5}$ to $7.0 \times 10^{-5}$ Pa. The halogen X of the hydrogen halide preferably is the same as the halogen of the phosphor matrix. As described after in Examples, the HX partial pressure can be determined by mass spectroscopy (mass filter). The HX partial pressure in the above-mentioned range can be achieved by the steps of, for example, placing a halogen source such as $EuX_2$ and a heater such as a resistance heater in the apparatus, and heating and evaporating the source by controlling the electric current of the heater. Otherwise, a small amount of HX gas may be introduced into the apparatus with keeping the inner pressure in the above-identified range.

Further, in order to prevent the formation of Eu—O complex, a partial pressure of water ($H_2O$) in the deposition atmosphere is preferably controlled at $7.0 \times 10^{-3}$ Pa or less, more preferably at $4.0 \times 10^{-3}$ Pa or less. The preferred partial pressure of water can be achieved by means of, for example, an exhaust system comprising a combination of a diffusion pump (or turbo molecular pump) and a cold trap (e.g., cryocoil, cryopanel, super trap).

In the vacuum evaporation-deposition apparatus, two electron beams generated by two electron guns are individually applied onto the evaporation sources. The accelerating voltage of each electron beam preferably is in the range of 1.5 kV to 5.0 kV. By applying the electron beams, the evaporation sources of matrix and activator materials are heated, vaporized, and reacts with each other to form the phosphor, which is deposited on the substrate. In this step, the accelerating voltage of each electron beam may be adjusted to control the vaporization rate of each source. The deposition rate, which means how fast the formed phosphor is deposited and accumulated on the substrate, is generally in the range of 0.1 to 1,000 μm/min., preferably in the range of 1 to 100 μm/min. The application of electron beams may be repeated twice or more to form two or more phosphor layers. The substrate may be cooled or heated, if needed, during the deposition process.

In the case where the phosphor layer is produced by single-vapor deposition (or pseudo-single vapor deposition), an evaporation source containing separately a matrix material and an activator material is placed perpendicularly to the direction in which the vapors come out of the source (namely, placed parallel to the substrate). In the deposition process, one electron beam is applied onto the source with its applied area selected. The period of time for applying the beam onto the area in which the matrix material or the activator material resides is controlled so that a stimulable phosphor film (layer) of even composition can be formed. As the evaporation source, the stimulable phosphor itself or a mixture of starting materials thereof may be used.

Before preparing the deposited film (layer) of stimulable phosphor, another deposited film consisting of the phosphor matrix (CsX) only may be beforehand formed. In this case, the resulting phosphor layer is well crystallized. In the thus-formed layered films, the additives such as the activator contained in the phosphor-deposited film are diffused into the matrix-deposited film while they are heated during the deposition and/or during the heat treatment performed after the deposition, and consequently the interface between the films is not always clear.

After the deposition process, the deposited film is preferably subjected to heat treatment so as to decompose Eu—O complex. An excess amount of $EuX_2$ is also decomposed by the heat treatment to release halogen X. The heat treatment is generally carried out at a temperature of 50° C. to 300° C. for 15 minutes to 20 hours under an inert gas atmosphere or an atmosphere of inert gas containing a small amount of oxygen or hydrogen gas. Examples of the inert gas include Ar, Ne and $N_2$ gases. The oxygen or hydrogen gas is, if needed, generally contained at a partial pressure of 2,000 Pa or less. The heat treatment may be carried out immediately after the deposited film is formed on the substrate in the apparatus, or otherwise it may be performed after the substrate on which the deposited film is formed is taken out of the apparatus.

As described above, even if the HX partial pressure is not increased in the deposition atmosphere, the formed Eu—O complex and an excess amount of $EuX_2$ can be decomposed only by the heat treatment so as to promote the activation of $Eu^{2+}$. In that case, the heat treatment is preferably carried out at a temperature of 150° C. to 250° C. for 30 minutes to 16 hours. However, the time and the temperature must be properly determined to give a good combination. For example, if the temperature is 150° C., 200° C. or 250° C., the time is preferably 8 to 16 hours, 1 to 8 hours or 0.5 to 1 hour, respectively. If the deposited film is heated too much, aggregates of Eu are formed in the columnar crystals to lower the activation efficiency of $Eu^{2+}$.

The thus-produced phosphor layer consists of europium activated cesium halide stimulable phosphor in the form of columnar crystals grown almost parallel to the thickness direction, and exhibits an ultraviolet light-excited instant emission spectrum satisfying the condition of:

$$0 < S(400\text{--}420) < 0.20$$

in which S(400–420) represents a ratio of the amount of light emitted by a luminous component giving an emission peak in the region of 400 to 420 nm based on the total amount of emitted light. The phosphor layer contains no binder and consists of the stimulable phosphor only, and there are cracks among the columnar crystals. The thickness of the phosphor layer is normally in the range of 50 to 1,000 μm, preferably in the range of 200 to 700 μm.

The vacuum evaporation-deposition method is not restricted to the above-described electron beam-evaporating method, and various known methods such as a resistance-heating method, a sputtering method, and a CVD method can be used.

It is not necessary that the substrate to be used for deposition is a support of the radiation image storage panel. For example, after formed on the substrate, the deposited film is peeled from the substrate and then laminated on the support with an adhesive to give a phosphor layer. Otherwise, the support may be omitted.

It is preferred to place a protective film on the surface of the deposited phosphor film, so as to ensure good handling of the radiation image storage panel in transportation and to obviate deterioration. The protective film preferably is transparent so as not to prevent the stimulating light from coming in or not to prevent the emission from coming out. Further, for protecting the storage panel from chemical deterioration and physical damage, the protective film preferably is chemically stable, physically strong, and of high moisture proof.

The protective film can be provided by coating the stimulable phosphor film with a solution in which an organic polymer (e.g., cellulose derivatives, polymethyl methacrylate, fluororesins soluble in organic solvents) is dissolved in a solvent, by placing a beforehand prepared sheet for the protective film (e.g., a film of organic polymer such as polyethylene terephthalate, a transparent glass plate) on the phosphor film with an adhesive, or by depositing vapor of inorganic compounds on the phosphor film.

Various additives may be dispersed in the protective film. Examples of the additives include light-scattering fine particles (e.g., particles of magnesium oxide, zinc oxide, titanium dioxide and alumina), a slipping agent (e.g., powders of perfluoroolefin resin and silicone resin) and a cross-linking agent (e.g., polyisocyanate). The thickness of the protective film generally is in the range of about 0.1 to 20 μm (if the film is made of polymer material) or in the range of about 100 to 1,000 μm (if the film is made of inorganic material such as silicate glass). For enhancing the resistance to stain, a fluororesin layer may be provided on the protective film. The fluororesin layer can be form by coating the surface of the protective film with a solution in which a fluororesin is dissolved or dispersed in an organic solvent, and drying the applied solution. The fluororesin may be used singly, but a mixture of the fluororesin and a film-forming resin is normally employed. In the mixture, an oligomer having a polysiloxane structure or perfluoroalkyl group can be further added. In the fluororesin layer, a fine powdery filler may be incorporated to reduce blotches caused by interference and to improve the quality of the resultant radiation image. The thickness of the fluororesin layer generally is in the range of 0.5 to 20 μm. For forming the fluororesin layer, additives such as a crosslinking agent, a film-hardening agent and an anti-yellowing agent can be used. In particular, the cross-linking agent is advantageously employed to improve durability of the fluororesin layer.

Thus, a radiation image storage panel of the invention can be prepared. The radiation image storage panel of the invention may have known various structures. For example, in order to improve the sharpness of the resultant image, at least one of the films (layers) may be colored with a colorant which does not absorb the stimulated emission but the stimulating light.

The present invention is further described by the following examples. In the examples, gases in the apparatus were measured according to mass spectroscopy by means of a remaining gas analyzer (mass filter, RGA200, available from Stanford Research System), to determine the HBr partial pressure in the deposition atmosphere.

EXAMPLE 1

(1) Preparation of CsBr Evaporation Source

Powdery CsBr (75 g) was placed in a powder molding zirconia die (inner diameter: 35 mm) and compressed in a powder molding press at a pressure of 50 MPa, to produce a tablet (diameter: 35 mm, thickness: 20 mm). The pressure applied to the powdery CsBr was approx. 40 MPa. The produced tablet was dried in a vacuum drying apparatus at 200° C. for 2 hours. The dried tablet had a density of 3.9 g/cm$^3$ and a water content of 0.3 wt. %.

(2) Preparation of EuBr$_m$ Evaporation Source

Powdery EuBr$_m$ (m is about 2.2, 25 g) was placed in a powder molding zirconia die (inner diameter: 25 mm) and compressed in a powder molding press at a pressure of 50 MPa, to produce a tablet (diameter: 25 mm, thickness: 10 mm). The pressure applied to the powdery EuBr$_m$ was approx. 80 MPa. The produced tablet was dried in a vacuum drying apparatus at 200° C. for 2 hours. The dried tablet had a density of 5.1 g/cm$^3$ and a water content of 0.5 wt. %.

(3) Formation of Phosphor Layer

A synthetic quartz substrate (support) was washed successively with an aqueous alkaline solution, purified water, and isopropyl alcohol, and then mounted to a substrate holder in an evaporation apparatus. In the apparatus, the above CsBr and EuBr$_m$ tablets were placed in the predetermined sites. Independently, 50 g of EuBr$_m$ was placed in a boat having a lid. The boat had many small porosities to prevent bumping, and was surrounded with a shield. The apparatus was then evacuated by means of a combination of a rotary pump, mechanical booster and turbo molecular pump, to reach a pressure of $1 \times 10^{-3}$ Pa.

In the apparatus, the substrate was heated to 200° C. by means of a sheath heater placed on the back side of the substrate. Electron beams from electron guns (accelerating voltage: 2.0 kV) were individually applied onto the tablets, to co-deposit and accumulate CsBr:Eu stimulable phosphor. In applying the electron beams, the emission currents supplied to the electron guns were controlled to 100 mA so that the phosphor was deposited at a deposition rate of 10 μm/minute. At the same time, the EuBr$_m$ in the boat was heated to vaporize by means of a resistance heater in which the electric current was controlled with a resistance power supply (direct current voltage: 4 volt), so that the HBr partial pressure in the deposition atmosphere was kept at $4.2 \times 10^{-5}$ Pa. The HBr partial pressure was monitored by means of a remaining gas analyzer.

After the evaporation-deposition was complete, the inner pressure was returned to atmospheric pressure, and the substrate was taken out of the apparatus. On the substrate, a deposited film (thickness: approx. 400 μm, area: 10 cm×10 cm) consisting of columnar phosphor crystals aligned densely and perpendicularly was formed.

The substrate having the deposited phosphor film was then placed on a vacuum-heating apparatus to which gases could be introduced. The apparatus was evacuated by means of a rotary pump to reach approx. 1 Pa, so that water adsorbed on the deposited film would be removed. Successively, the substrate was heated at 200° C. for 2 hours under nitrogen gas atmosphere, and cooled in vacuo and then taken out of the apparatus.

Thus, a radiation image storage panel of the invention having a support (substrate) and a deposited phosphor layer was prepared.

EXAMPLES 2 AND 3

The procedures of Example 1 were repeated except for changing the HBr partial pressure in the step (3) to $4.5 \times 10^{-5}$ Pa or $4.7 \times 10^{-5}$ Pa by controlling the electric current of the resistance heater, to form a deposited phosphor film (layer).

Thus, radiation image storage panels of the invention were prepared.

Comparison Example 1

The procedures of Example 1 were repeated except that the $EuBr_m$ in the step (3) was not heated to vaporize, to form a deposited phosphor film (layer) under a HBr partial pressure of $1.4 \times 10^{-5}$ Pa.

Thus, a radiation image storage panel for comparison was prepared.

Comparison Example 2

The procedures of Example 1 were repeated except for changing the HBr partial pressure in the step (3) to $8.0 \times 10^{-5}$ Pa by controlling the electric current of the resistance heater, to form a deposited phosphor film (layer).

Thus, a radiation image storage panel for comparison was prepared.

[Evaluation of Radiation Image Storage Panel-1]

The prepared radiation image storage panels were evaluated in the following manner.

The radiation image storage panel was encased in a room light-shielding cassette and then exposed to X-rays (voltage: 80 kVp, current: 16 mA). Subsequently, the storage panel was taken out of the cassette and scanned with a He—Ne laser beam (wavelength: 633 nm). The stimulated emission was detected by a photomultiplier to examine the sensitivity based on a relative value of the luminance of stimulated emission. The sensitivity is expressed in terms of a relative value determined under the condition that the value of Comparison example 1 is set at 100.

Separately, the phosphor layer of the radiation image storage panel was exposed to ultraviolet light (wavelength: 290 nm), and the instant emission spectrum was observed. The obtained spectrum was then resolved into plural spectrum components on the basis of Gaussian fitting, and the integrated intensity of each component was estimated within each half-width. The thus-estimated intensities of all the components were totalized to obtain the total amount of emitted light. The integrated intensity of the spectrum component ranging from 400 to 420 nm was reduced into a ratio based on the total amount of emitted light, to obtain S(400–420).

Figure 2:
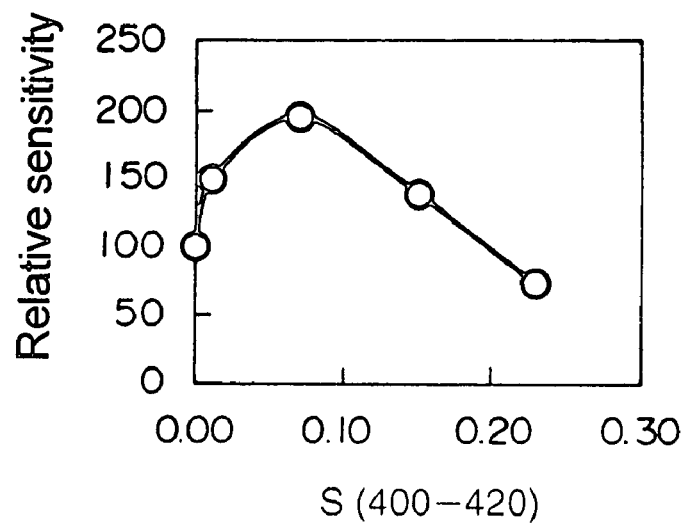
FIG. 2 is a graph showing a relation between the emission ratio S(400–420) and the sensitivity of radiation image storage panel. The phosphor layers of the tested storage panels were produced by vacuum vapor deposition under various different HBr partial pressures.

The results are set forth in FIGS. 1 and 2 and Table 1.

TABLE 1

| Example | HBr partial pressure (Pa) | Heating treatment temp. (° C.) | time (hour) | atm. (Pa) | $S_{(400-420)}$ | Sensitivity |
|---|---|---|---|---|---|---|
| Ex. 1 | $4.2 \times 10^{-5}$ | 200 | 2 | $N_2$ | 0.01 | 150 |
| Ex. 2 | $4.5 \times 10^{-5}$ | 200 | 2 | $N_2$ | 0.07 | 195 |
| Ex. 3 | $4.7 \times 10^{-5}$ | 200 | 2 | $N_2$ | 0.15 | 139 |
| Com. 1 | $1.4 \times 10^{-5}$ | 200 | 2 | $N_2$ | 0.00 | 100 |
| Com. 2 | $8.0 \times 10^{-5}$ | 200 | 2 | $N_2$ | 0.23 | 74 |

FIG. 1 shows an ultraviolet light-excited emission spectrum of the phosphor layer in the radiation image storage panel of the invention (Example 2). In FIG. 1. the curve 1 stands for the observed instant emission spectrum and the curves 2 to 4 stand for spectrum components extracted from the observed spectrum on the basis of Gaussian fitting.

FIG. 2 is a graph showing a relation between the emission ratio S(400–420) and the sensitivity of radiation image storage panel. The phosphor layers of the tested storage panels were produced by vacuum vapor deposition under various different partial pressures of HBr.

As is evident from Table 1 and FIG. 2, each storage panel (prepared in Examples 1 to 3) giving an instant emission spectrum satisfying the condition of 0<S(400–420)<0.20 was remarkably improved in sensitivity, as compared with the panel for comparison giving an emission spectrum of S(400–420)=0 (Comparison example 1) or 0.2<S(400–420) (Comparison example 2).

EXAMPLE 4

(1) Preparation of CsBr Evaporation Source

A tablet of CsBr was prepared in the same manner as in Example 1.

(2) Preparation of $EuBr_m$ Evaporation Source

A tablet of $EuBr_m$ was prepared in the same manner as in Example 1.

(3) Formation of Phosphor Layer

A synthetic quartz substrate (support) was washed successively with an aqueous alkaline solution, purified water, and isopropyl alcohol, and then mounted to a substrate holder in an evaporation apparatus. In the apparatus, the above CsBr and $EuBr_m$ tablets were placed in the predetermined sites. The apparatus was then evacuated with a combination of a rotary pump, mechanical booster and turbo molecular pump, to reach $1 \times 10^{-3}$ Pa. The substrate was heated to 200° C. by means of a sheath heater placed on the back side of the substrate. Electron beams from electron guns (accelerating voltage: 2.0 kV) were individually applied onto the tablets, to co-deposit and accumulate CsBr:Eu stimulable phosphor. In applying the electron beams, the emission currents supplied to the electron guns were controlled to 100 mA, so that the molar ratio Eu/Cs in the phosphor was 0.003/1 and so that the phosphor was accumulated at a deposition rate of 10 μm/minute. The HBr partial pressure in the deposition atmosphere was $1.4 \times 10^{-5}$ Pa.

After the evaporation-deposition was complete, the inner pressure was returned to atmospheric pressure, and the substrate was taken out of the apparatus. On the substrate, a deposited film (thickness: approx. 400 μm, area: 10 cm×10 cm) consisting of columnar phosphor crystals aligned densely and perpendicularly was formed.

The substrate having the deposited phosphor film was then placed on a vacuum-heating apparatus to which gases could be introduced. The apparatus was evacuated by means of a rotary pump to reach approx. 1 Pa, so that water adsorbed on the deposited film would be removed. Successively, the substrate was heated at 150° C. for 8 hours under nitrogen gas atmosphere, and cooled in vacuo and then taken out of the apparatus.

Thus, a radiation image storage panel of the invention having a support (substrate) and a deposited phosphor layer was prepared.

EXAMPLES 5 TO 10

The procedures of Example 4 were repeated except for changing the temperature and the time of the heating treatment in the step (3) into the values set forth in Table 2, to form a deposited phosphor film (layer).

Thus, radiation image storage panels of the invention were prepared.

Comparison Example 3

The procedures of Example 4 were repeated except that the heating treatment in the step (3) was not performed, to form a deposited phosphor film (layer).

Thus, a radiation image storage panel for comparison was prepared.

Comparison Examples 4 and 5

The procedures of Example 4 were repeated except for changing the temperature and the time of the heating treatment in the step (3) into the values set forth in Table 2, to form a deposited phosphor film (layer).

Thus, radiation image storage panels for comparison were prepared.

[Evaluation of Radiation Image Storage Panel-2]

The prepared radiation image storage panels were also evaluated in the manner described above. The sensitivity is expressed in terms of a relative value determined under the condition that the value of Comparison example 5 is set at 100. The phosphor layer of the storage panel was exposed to ultraviolet light (wavelength: 290 nm), and the instant emission spectrum was observed. On the basis of the obtained instant emission spectrum, S(400–420) was calculated in the manner described above.

Figure 3:
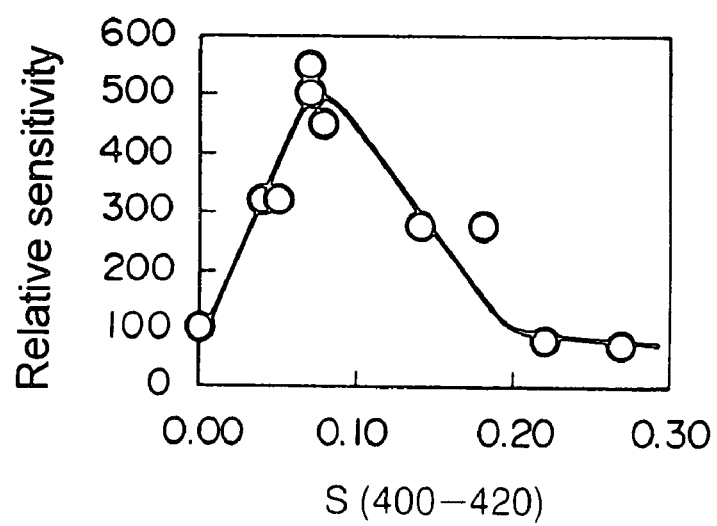
FIG. 3 is another graph showing a relation between the emission ratio S(400–420) and the sensitivity of storage panel. The phosphor layers of the tested storage panels were subjected to heating treatments under various different conditions.

The results are set forth in FIG. 3 and Table 2.

TABLE 2

| Example | HBr partial pressure (Pa) | Heating treatment temp. (° C.) | time (hour) | atm. (Pa) | $S_{(400-420)}$ | Sensitivity |
|---|---|---|---|---|---|---|
| Ex. 4 | 1.4 × 10$^{-5}$ | 150 | 8 | N$_2$ | 0.18 | 344 |
| Ex. 5 | 1.4 × 10$^{-5}$ | 150 | 16 | N$_2$ | 0.14 | 344 |
| Ex. 6 | 1.4 × 10$^{-5}$ | 200 | 1 | N$_2$ | 0.08 | 556 |

TABLE 2-continued

| Example | HBr partial pressure (Pa) | Heating treatment temp. (° C.) | time (hour) | atm. (Pa) | $S_{(400-420)}$ | Sensitivity |
|---|---|---|---|---|---|---|
| Ex. 7 | 1.4 × 10$^{-5}$ | 200 | 2 | N$_2$ | 0.07 | 681 |
| Ex. 8 | 1.4 × 10$^{-5}$ | 200 | 4 | N$_2$ | 0.04 | 400 |
| Ex. 9 | 1.4 × 10$^{-5}$ | 250 | 0.5 | N$_2$ | 0.07 | 625 |
| Ex. 10 | 1.4 × 10$^{-5}$ | 250 | 1 | N$_2$ | 0.05 | 410 |
| Com. 3 | 1.4 × 10$^{-5}$ | — | — | — | 0.22 | 100 |
| Com. 4 | 1.4 × 10$^{-5}$ | 150 | 4 | N$_2$ | 0.27 | 91 |
| Com. 5 | 1.4 × 10$^{-5}$ | 250 | 3 | N$_2$ | 0.00 | 125 |

FIG. 3 is a graph showing a relation between the emission ratio S(400–420) and the sensitivity of storage panel. The phosphor layers of the panels were subjected to heat treatments under various different conditions.

As is also evident from Table 2 and FIG. 3, each storage panel (prepared in Examples 4 to 10) giving an instant emission spectrum satisfying the condition of 0<S(400–420) <0.20 was remarkably improved in sensitivity, as compared with the storage panel for comparison giving an emission spectrum of S(400–420)=0 (Comparison example 5) or 0.2<S(400–420) (Comparison examples 3 and 4).

What is claimed is:

1. A radiation image storage panel comprising a phosphor layer produced by a vapor phase deposition method, wherein the phosphor layer comprises an europium activated cesium halide stimulable phosphor and exhibits an ultraviolet light-excited emission spectrum satisfying the condition of:

$$0 < S(400-420) < 0.20$$

in which S(400–420) represents a ratio of an amount of a light emitted by a luminous component giving an emission peak in the region of 400 to 420 nm based on the total amount of emitted light.

2. The radiation image storage panel of claim 1, in which the europium activated cesium halide stimulable phosphor is represented by the following formula (I):

$$CsX \cdot aM^{I}X' \cdot bM^{II}X''_2 \cdot cM^{III}X'''_3 : zEu \qquad (I)$$

in which $M^{I}$ is at least one alkali metal element selected from the group consisting of Li, Na, K and Rb; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of X, X', X" and X''' is independently at least one halogen selected from the group consisting of F, Cl, Br and I; and a, b, c and z are numbers satisfying the conditions of $0 \leq a < 0.5$, $0 \leq b < 0.5$, $0 \leq c < 0.5$ and $0 < z < 1.0$, respectively.

3. The radiation image storage panel of claim 2, in which X in the formula (I) is Br.

4. The radiation image storage panel of claim 1, in which the phosphor layer exhibits an ultraviolet light-excited emission spectrum satisfying the condition of 0.01<S(400–420) <0.20.

* * * * *